Feb. 23, 1954   R. S. GRANT   2,670,252
OIL RING
Filed Aug. 11, 1952
Fig. 6
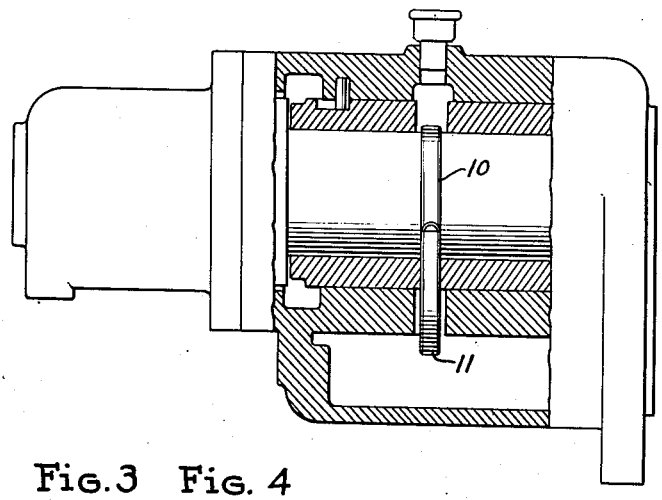
Fig. 2   Fig. 3   Fig. 4
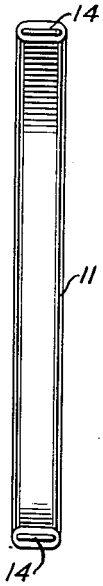 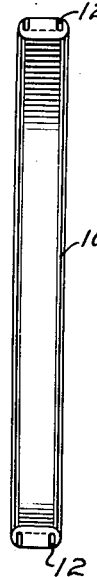 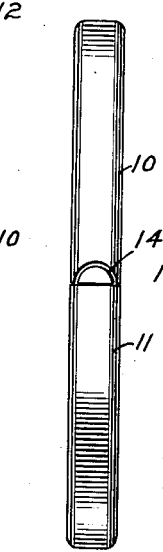
Fig. 1
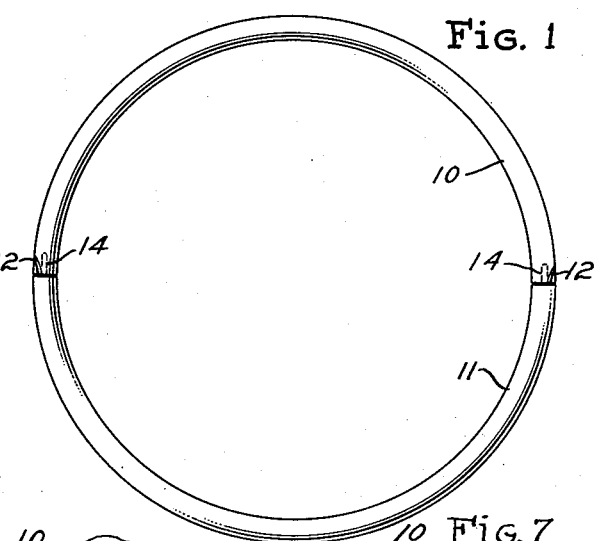
Fig. 5
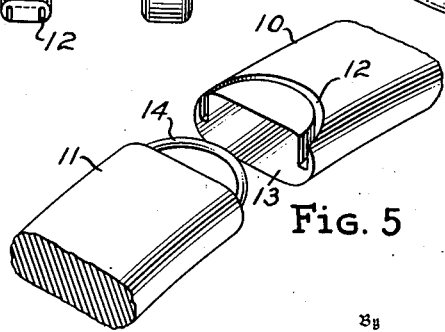
Fig. 7
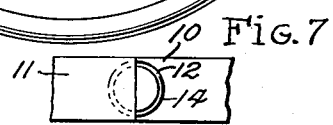
Fig. 8
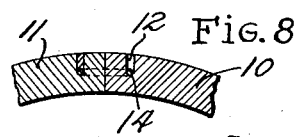
Inventor
Raymond S. Grant
By
Attorney Patented Feb. 23, 1954

2,670,252

UNITED STATES PATENT OFFICE 2,670,252

OIL RING

Raymond S. Grant, Port Arthur, Tex.

Application August 11, 1952, Serial No. 303,710

5 Claims. (Cl. 308—129)

This invention relates to oil rings and more particularly to two-piece oil rings of the floating type.

In order to provide automatic lubrication of plain, ball, or roller bearings used on a rotating shaft, it has been common practice in the past to provide a reservoir of oil beneath the particular shaft bearing. Oil is elevated to the upper portion of the shaft by means of a floating ring which is placed around the shaft. The diameter of the ring is substantially larger than the diameter of the shaft in order that the lower end of the ring will dip into the oil reservoir. As the shaft rotates, it drives the ring along with it, and the latter picks up oil from the cellar reservoir and carries it to the top of the shaft for distribution throughout the bearing surfaces. Various forms for the structure of these rings have been suggested heretofore and in some instances belts or chains, rather than a ring of solid material, have been used, but in general the ring seems to be more practical.

It is particularly advantageous to have a two-piece ring in order to permit easy application and removal of the ring without tearing-down the entire machine. Accordingly, the majority of rings of this type are made in two pieces with a hinge at one joint and some sort of fastening means at the other. Manufacture of such devices, however, presents additional problems. In the event that a joint such as a dovetail connection is used, two rings must be machined in order to produce one. This is so because of the necessary overlap required by the joint. In addition, this requires considerable hand machining and fitting which, of course, adds to the cost of the ring. Even then, the problem of obtaining a finished product which is a true circle which is balanced is a difficult one. Examples of prior art rings may be found in the patents to: Geisenhoner, 734,317, 1903; Wood, 1,244,568, 1917; Homberger, 1,386,931, 1921; Lower, 2,386,963, 1945.

It is an object of this invention to provide a two-piece oil ring.

It is a further object of this invention to provide a means for joining the two halves of the ring which enables the ring to be easily assembled and disassembled.

It is a further object of the invention to provide a means for joining the ring which will provide a positive lock for the two halves when in their assembled relation.

It is a still further object of this invention to provide a two-piece ring which may be manufactured so that only a single ring need be machined to provide each finished product.

Other objects will be apparent from the following description read in conjunction with the attached sheet of drawings in which, Figure 1 is a side elevation of the assembled ring, Figures 2 and 3 are views looking toward the joining faces of the two sections, Figure 4 is a view of the assembled joint, Figure 5 is a detail of the joint, Figure 6 is a view of a plain bearing showing the ring of this invention in assembled relation thereon, Figure 7 is a top plan view of the assembled joint structure, and Figure 8 is a side view in section of Figure 7.

The oil ring of this invention includes a pair of semi-annular members 10 and 11 which are joined together to form a two-piece annular oil ring. These two members are preferably metallic and have at least some degree of resiliency. Obviously, equivalent plastic materials could also be used. The means for joining the members 10 and 11 is shown most clearly in Figure 5. The member 10 has an open-ended semi-circular groove 12 formed in its outer surface adjacent the joining edge 13. The member 11 has a loop 14 (preferably metallic) extending from its joining face. The loop 14 is of substantially the same diameter as is the groove 12 so that it may be sprung into place within the groove to hold the elements 10 and 11 in assembled relation. It will be obvious that this joint must be provided at each end of the members 10 and 11 as shown in Figure 1. To separate the two halves of the ring it is only necessary to compress the member 10 adjacent its ends to withdraw the groove 12 from engagement with the loop 14.

In manufacture of the oil rings of this invention the deficiencies in manufacture of prior art rings are largely overcome. Initially an annulus is machined to approximately the desired dimensions. This is then sawed on a diameter and the two halves are later re-united by a sweat joint or other convenient temporary attaching means. The annulus thus reformed is then machined and finished to a true circle. A pair of circular grooves are then formed in the outer surface of the annulus, diameters of which overlie the lines along which the annulus was originally sawed. The sweated joint is then destroyed. A pair of wire-like loops 14 of steel or similar material are then placed in the grooves in member 11 and soldered or otherwise rigidly affixed in place.

The loops 14 when sprung into the grooves 12 against the resiliency of members 10 and 11, will hold the latter members securely together. It will be obvious that the loops 14 need not both be placed on the same member. One may be mounted on member 10 and the other on member 11, for example, and still achieve the desired result. It will be further obvious that while the open-ended grooves 12 and loops 14 have been shown and described herein as circular, they could, of course, take various forms. The circular form is preferred, however, principally because of the ease of machining.

This joint, therefore, provides a dependable and efficient fastener and avoids the necessity of machining two rings in order to produce one finished product as is the case in the manufacture of rings of the prior art.

From the foregoing it will be apparent that there is described herein a greatly improved two-piece oil ring and one which will have wide application in all kinds of machines utilizing this type of lubrication system.

I claim:

1. A two-piece floating oil ring for carrying oil to a rotary shaft bearing from a cellar well comprising: a pair of resilient semi-annular members; means for joining said members around the shaft to be lubricated, said means including an open-ended groove formed in the outer face of said members at each end thereof and a pair of wire-like loops rigidly secured within two of said grooves and extending outwardly thereof, the outwardly extending portion of each of said loops forming attaching means for engagement within the other two grooves for releasably joining the said two semi-annular members to form an annular oil ring.

2. A two-piece floating oil ring for carrying oil to a rotary shaft bearing from a cellar well comprising: a pair of resilient semi-annular members having substantially flat inner and outer faces; means for joining said members around the shaft to be lubricated, said means including an open-ended semi-circular groove formed in the outer face of said members at each end thereof and a pair of circular wire-like rings secured within two of said grooves and extending outwardly thereof, the outwardly extending portion of each of said rings forming attaching means for engagement within the other two semi-circular grooves for releasably joining the two said ring-like members to form an oil ring.

3. A two-piece floating oil ring for carrying oil to a rotary shaft bearing from a cellar well comprising: a pair of resilient semi-annular members having substantially flat inner and outer surfaces; means for joining said members including a pair of open-ended semi-circular grooves, one formed in the outer face of one of said members adjacent each end thereof, and a pair of wire-like loops, one rigidly attached to each of the joining faces of the other of said members for engagement within the said semi-circular grooves to hold the two members in releasably joined relation.

4. A two-piece oil ring as defined by claim 1 in which the cross section of the ring is a flat-sided oval.

5. A two-piece floating oil ring for carrying oil to a rotary shaft bearing from a cellar well comprising: a pair of resilient semi-annular members having a cross section which is a flat-sided oval; means for joining said members including open-ended circular grooves, one formed in the outer face of each of said members adjacent each end thereof, the open ends of said grooves being located in the joining faces of said members, and a pair of circular wire-like loops, one secured within each of the grooves on one of said members and extending outwardly thereof, the outwardly extending portion of said loops forming attaching means for engagement within the grooves on the other of said members for releasably joining the two to form an oil ring.

RAYMOND S. GRANT.

References Cited in the file of this patent

UNITED STATES PATENTS

| Number | Name | Date |
| --- | --- | --- |
| 2,502,185 | Thomas | Mar. 28, 1950 |

FOREIGN PATENTS

| Number | Country | Date |
| --- | --- | --- |
| 346,725 | France | Feb. 7, 1905 |